Feb. 20, 1962 J. J. BLACK 3,022,087
LEAF SPRING VEHICLE SUSPENSION SYSTEM
Filed Oct. 1, 1959 5 Sheets-Sheet 1

INVENTOR.
James J. Black.
BY
Wood, Herron & Evans.
ATTORNEYS.

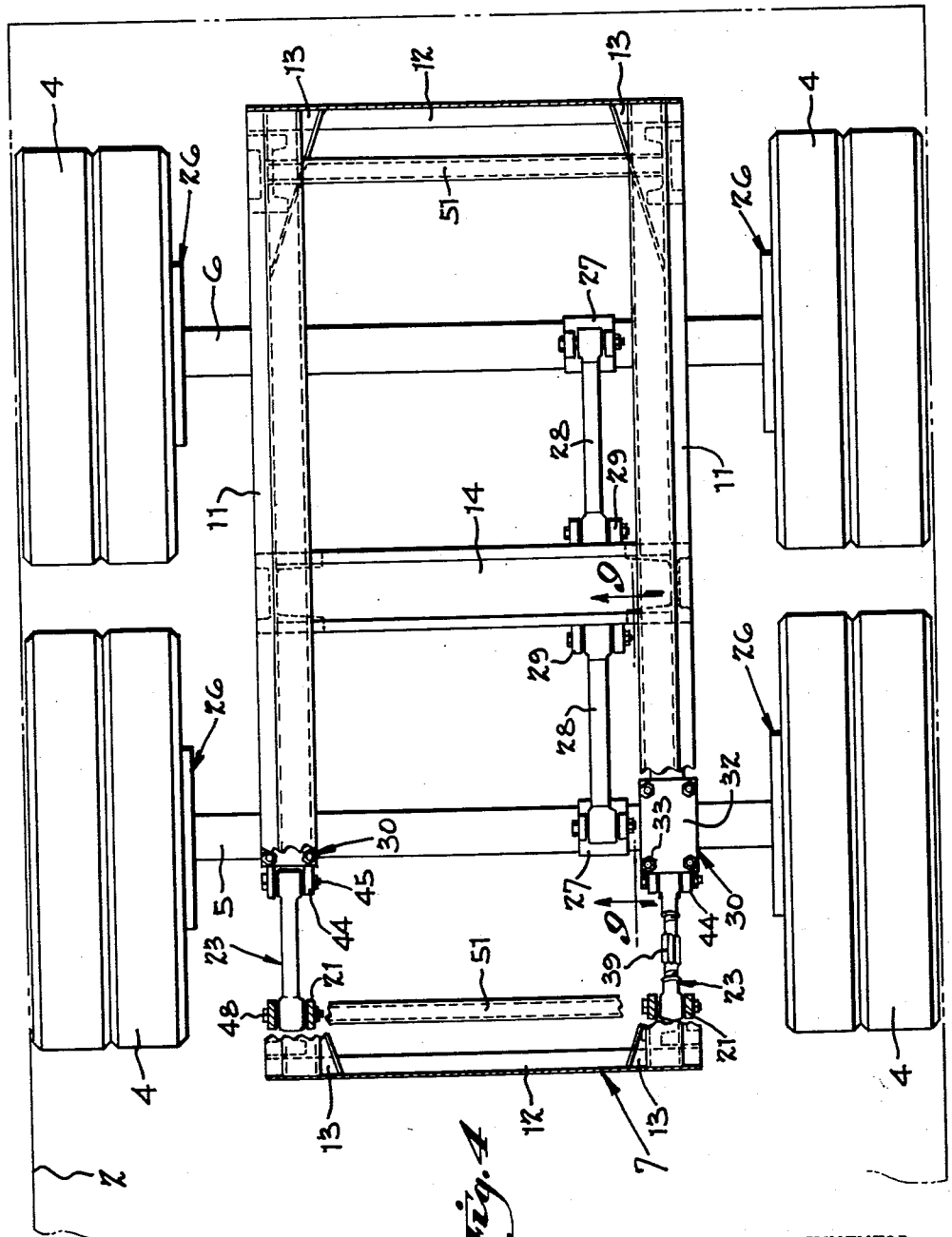

Feb. 20, 1962  J. J. BLACK  3,022,087
LEAF SPRING VEHICLE SUSPENSION SYSTEM
Filed Oct. 1, 1959  5 Sheets-Sheet 3
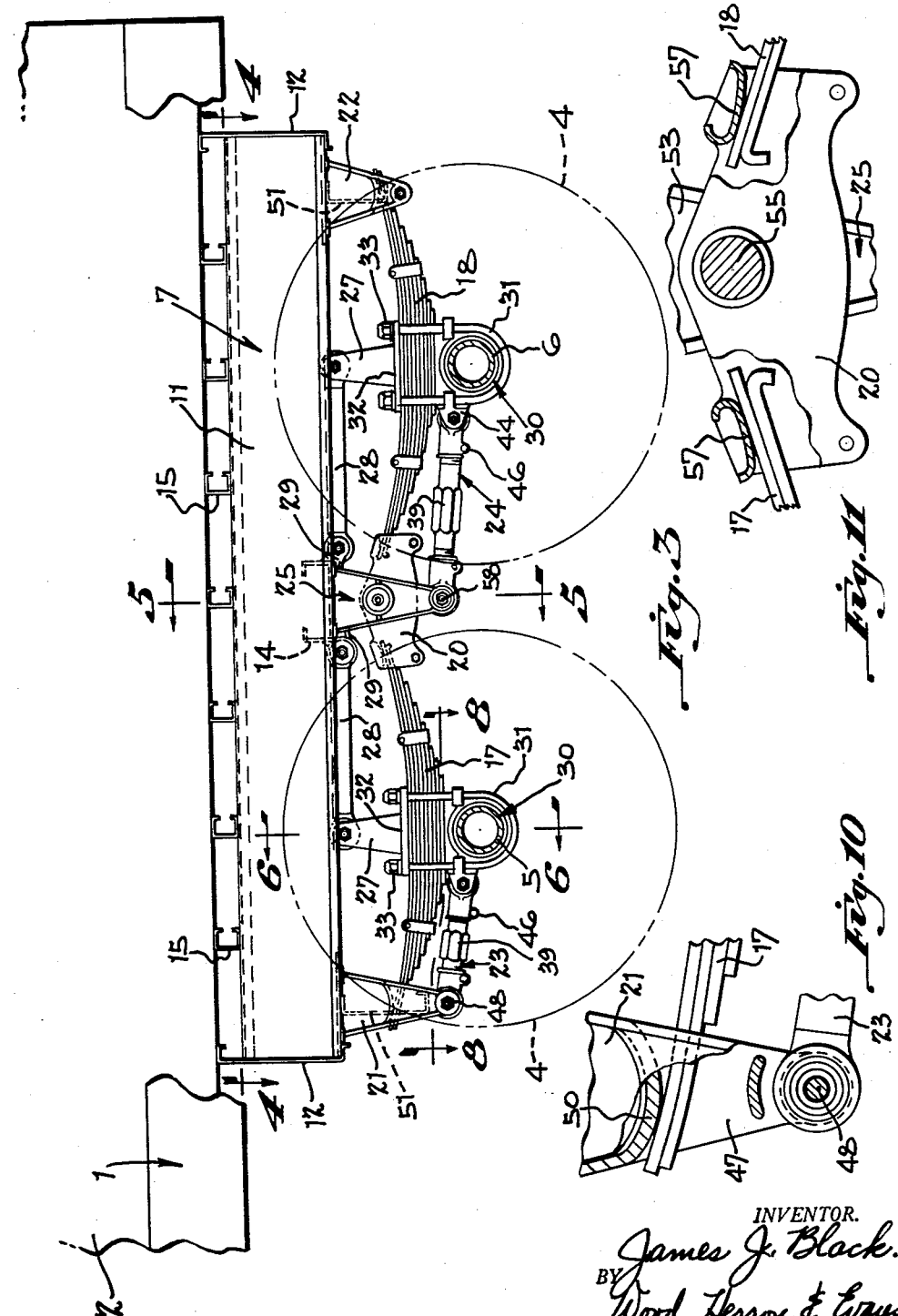
INVENTOR.
James J. Black.
BY Wood, Herron & Evans,
ATTORNEYS.

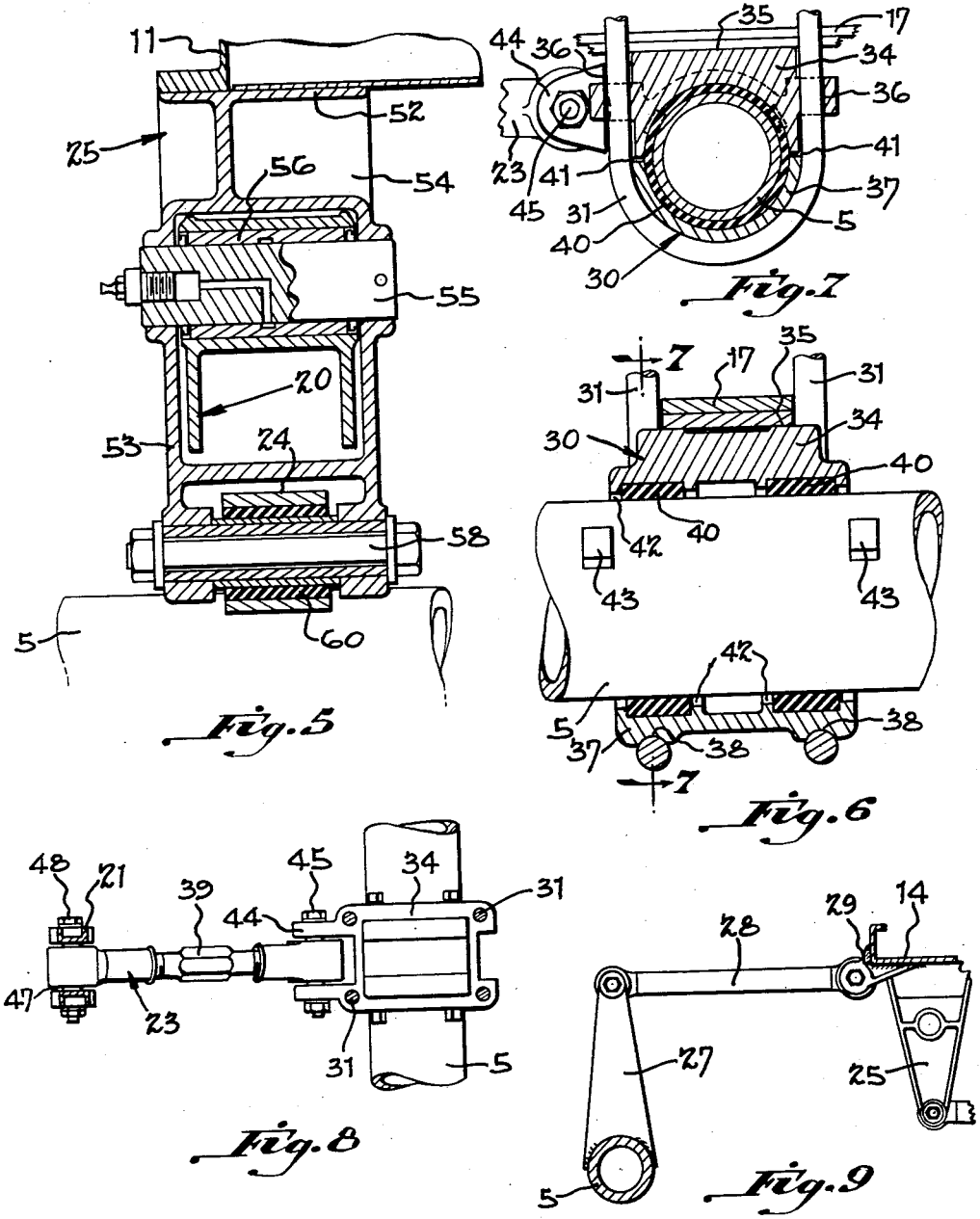

United States Patent Office 3,022,087
Patented Feb. 20, 1962

1

3,022,087
LEAF SPRING VEHICLE SUSPENSION SYSTEM
James J. Black, Cincinnati, Ohio, assignor to Trailmobile Inc., Cincinnati, Ohio, a corporation of Delaware
Filed Oct. 1, 1959, Ser. No. 843,746
7 Claims. (Cl. 280—104.5)

This invention relates to leaf spring suspension systems for semi-trailers and other vehicles which are equipped with tandem road wheels, wherein the weight load of the vehicle is carried in equalized fashion upon the tandem road wheels at opposite sides of the vehicle to reduce the loading of the individual wheels.

One of the primary objectives of the present invention has been to provide a tandem leaf spring suspension system which brings about improved spring action through equalized weight distribution, and which also brings about improved braking action by isolating the braking torque from the leaf springs.

Present day semi-trailers and other draft type road vehicles are provided with power braking systems, usually air-operated, which apply braking force to the individual wheels of the vehicle for efficient braking. In the case of a semi-trailer, for which the present suspension system is particularly intended, the forward end of the semi-trailer is supported upon the tractor, while its rearward portion is carried upon the tandem suspension system. The tractor air brake system includes air lines which are coupled to the semi-trailer to regulate the trailer brakes and the tractor brakes concurrently by operation of the service brake pedal in the cab of the tractor. The wheel brakes in general comprise a drum or other braking element carried by each wheel, with brake shoes or other friction elements anchored to the trailer axles and actuated by a suitable air-operated diaphragm or air cylinder. When the brakes are applied therefore, the braking force acting upon the rotating wheels tends to rotate the axles upon which the wheels are journalled. If this torque force is resisted by the leaf springs, then the spring reaction and deflection under torque causes the trailer wheels to bounce or skip, particularly if the roadway surface is rough or uneven. This rebounding action induced by the springs greatly reduces the stopping distance and also causes excessive tire wear through tire skidding.

According to the principles of the present invention, the tandem spring suspension system is arranged to stabilize the axles against the torque forces which are generated when the brakes are applied and is also arranged to equalize the weight distribution between the tandem axles so as to provide a highly efficient spring suspension. According to this concept, the tandem springs are completely isolated from the torque forces and hence are not deflected or otherwise acted upon when the brakes are applied. As a consequence, the suspension system distributes the weight load under equalized conditions and provides full spring action when the brakes are applied so as to keep the tandem wheels in smooth tracking contact with the roadway, thereby to substantially decrease the stopping distance and to decrease tire wear through elimination of wheel bounce due to spring reaction.

In general, a structure embodying the principles of this invention may comprise an undercarriage having a pair of tandem axles extending transversely of the undercarriage and spaced downwardly below it. The tandem road wheels, which are journalled at opposite ends of the axles, include the conventional wheel braking mechanism which imparts a turning force to the axles when the brakes are applied. The undercarriage is supported upon tandem leaf springs at opposite sides, the outer ends of the tandem springs being in bearing engagement with fixed

2 spring hangers projecting downwardly from the undercarriage at opposite sides, while the adjacent inner ends of the tandem leaf springs engage the outer ends of respective rockers pivotally connected to the undercarriage at opposite sides. The weight load is thus divided between the tandem leaf springs through the pivotally mounted rockers.

In order to permit the axles to shift vertically while maintaining the axles and springs in alignment with the spring hangers and rockers, each axle includes a pair of radius rods having outer ends pivotally connected to the undercarriage, such that the axles are free to swing in a generally vertical arc relative to the undercarriage in response to spring deflection. In addition, each axle is provided with at least one torque arm projecting upwardly, the upper end of the arm being pivotally connected to a link extending from the undercarriage. The arms and links completely absorb the torque forces which act upon the axles during brake operation, thus preventing any brake torque interference with normal spring action.

By reason of the combination of the radius rods and torque arms and links, the leaf springs tend to move in substantially horizontal planes with the axles which are non-rotatable. In order to provide the desired equalizing action according to the present invention, the leaf springs are joined to the axles through spring seats which are yieldably connected to the axles, each spring seat having resilient bushings interposed between the axle and seat and clamped under compression such that each leaf spring (and its seat) is free to twist or turn, within limits, about the axle in response to impact forces. As a consequence, when one axle is deflected upwardly, its leaf spring is deflected, and at the same time, it turns or swings angularly about the axle, since one end of the spring is seated against the fixed hanger while its opposite end is seated against an end of the shiftable rocker. As a consequence, the end of the turning spring forces one end of the rocker upwardly, which in turn, forces the adjacent end of the tandem spring downwardly, such that a portion of shock is absorbed by the second tandem spring. By virtue of the cushioned spring seats in combination with the torque arms and links, the improved suspension system provides smoother riding qualities through efficient load equalization, greater safety by reducing the required stopping distance, and reduces tire wear due to brake application.

The various features and advantages of the invention will be more fully apparent to those skilled in the art from the following detailed description taken in conjunction with the drawings.

In the drawings:

FIGURE 3 is a sectional view taken along line 3—3 of FIGURE 2, illustrating the general arrangement of the suspension system as viewed from the side.

FIGURE 4 is a top plan view taken along line 4—4 of FIGURE 3, further illustrating the undercarriage and suspension system.

FIGURE 5 is an enlarged sectional view taken along line 5—5 of FIGURE 3, detailing the rocker arm and its mounting bracket.

FIGURE 6 is an enlarged sectional view taken along line 6—6 of FIGURE 3, detailing one of the spring seats and the yieldable connection thereof to the axle.

FIGURE 7 is a sectional view taken along line 7—7 of FIGURE 6, further illustrating the spring seat and axle structure.

FIGURE 8 is a sectional view taken along line 8—8 of FIGURE 3, illustrating the spring seat of the forward axle and its lower radius rod connection.

FIGURE 9 is a sectional view taken along line 9—9 of FIGURE 4, showing the rocker and link connection of the forward axle.

FIGURE 10 is an enlarged fragmentary side view taken from FIGURE 3, detailing one of the fixed spring hangers of the suspension system.

FIGURE 11 is an enlarged fragmentary sectional view taken from FIGURE 3, further detailing the rocker of the suspension system.

Figure 12:
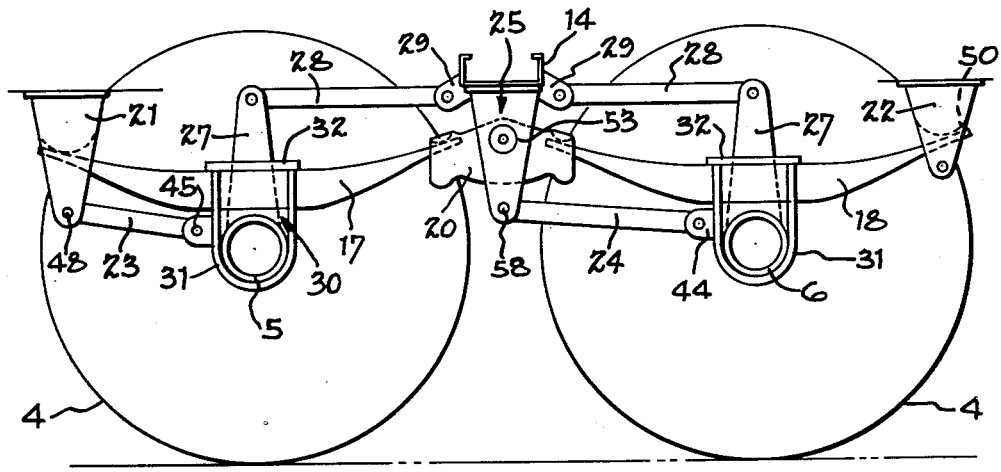
Figure 13:
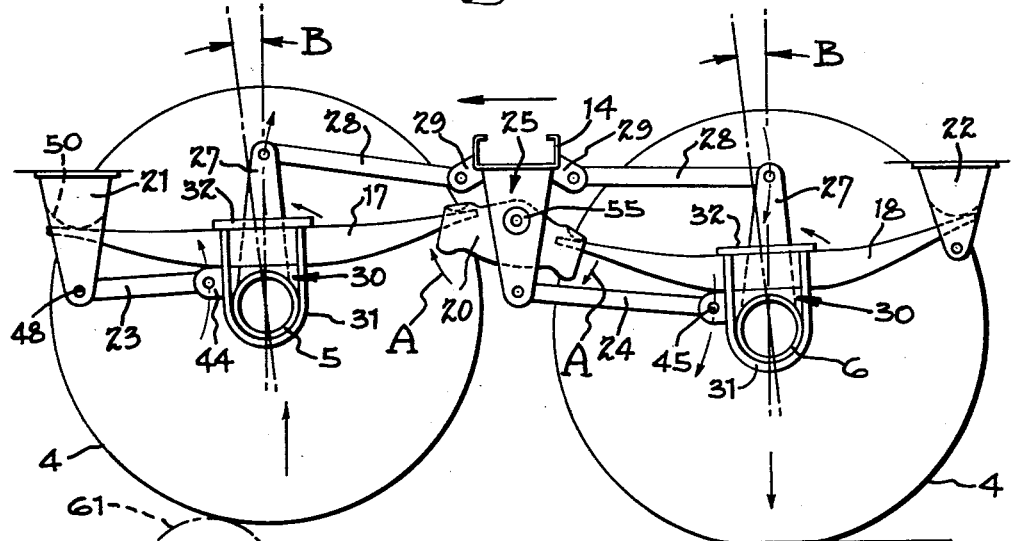

FIGURES 12 and 13 are diagrammatic side views illustrating the operation of the spring suspension system.

Figures 2, 14:
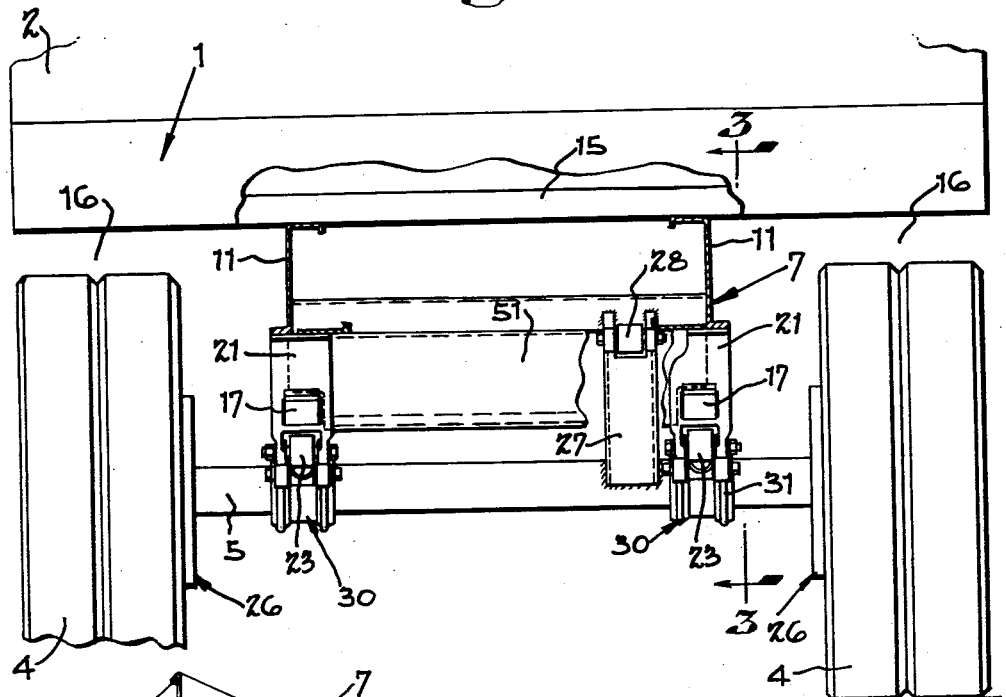
FIGURE 2 is an enlarged vertical sectional view, taken along line 2—2 of FIGURE 1, showing the general arrangement of the undercarriage and spring suspension system.

FIGURE 14 is a perspective view illustrating the general arrangement of the suspension system and undercarriage as viewed from a point below the vehicle.

*General arrangement*

Figure 1:
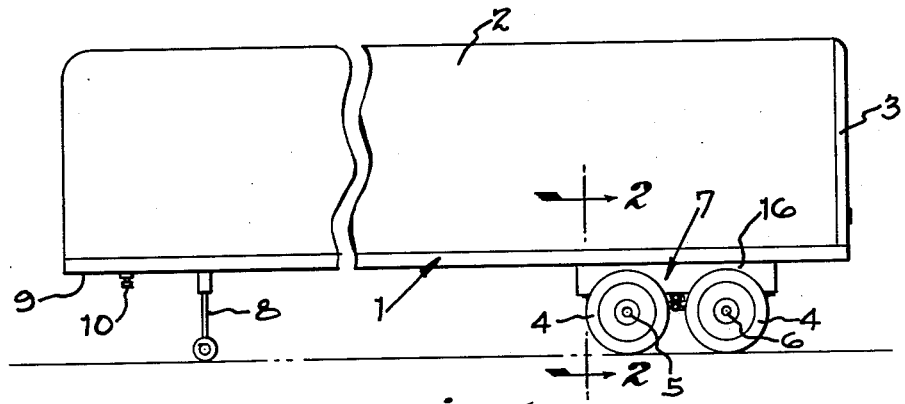
FIGURE 1 is a diagrammatic side elevation illustrating a typical semi-trailer equipped with a tandem spring suspension system according to the present invention.

The semi-trailer illustrated diagrammatically in FIGURE 1, in general comprises a main frame 1, supporting a cargo housing 2 which includes rearward doors 3 for loading and unloading. The rearward portion of the semi-trailer includes pairs of tandem road wheels 4—4 journalled upon axles 5 and 6, yieldably carried by the spring suspension system of this invention, which is incorporated in a self-contained subframe or undercarriage, indicated generally at 7.

The forward portion of the semi-trailer is provided with a retractable landing gear or prop structure, indicated at 8 which engages the ground for support when the semi-trailer is uncoupled from the tractor. The undersurface of the frame 1, forwardly of the landing gear, comprises an upper fifth wheel 9 including a downwardly projecting king pin 10. When the trailer is coupled to the tractor, the fifth wheel 9 of the semi-trailer rests upon the lower fifth wheel of the tractor, which includes coupling jaws for establishing a draft connection with the king pin 10. Accordingly, the weight load of the forward portion of the semi-trailer is supported upon the tractor (with the landing gear 8 retracted) while the rearward portion of the semi-trailer is supported by the tandem spring suspension system.

As shown in FIGURES 2, 3 and 4, the undercarriage 7 generally comprises a pair of side plates 11—11 and end plates 12—12, the plates being channel-shaped in cross section, and welded to provide a rigid box-like structure, with the corners stiffened by suitable gussets 13 (FIGURE 4). The undercarriage also includes an intermediate cross member 14, generally channel-shaped in cross section, for anchoring certain components of the suspension system, as explained later. As shown in FIGURES 2 and 3, a series of transverse beams 15, generally channel-shaped in cross section, extend across the top of the undercarriage and join the same to the frame 1 of the trailer body.

As best shown in FIGURE 2, the frame 1 and trailer body extend outwardly beyond the undercarriage at opposite sides in overhanging relationship with respect to the road wheels 4, the clearance 16 being maintained between the wheels and body for normal spring action during road transport. It will be observed in this view that the springs and other components of the suspension system all reside substantially in an inboard position with respect to the undercarriage. The several components of the suspension system are all mounted upon the undercarriage which forms a self-contained load-bearing structure.

*Spring suspension system*

Described generally with reference to FIGURE 3, the weight load of the undercarriage is transmitted to the tandem axles 5 and 6 through the companion leaf springs 17 and 18 disposed in tandem at opposite sides of the undercarriage. It will be understood (FIGURES 2 and 4) that several of the components of the suspension system, which are described in the singular with reference to FIGURE 3, are in duplicate at opposite sides of the undercarriage. In order to equalize the weight load which is imposed upon the tandem axles, the adjacent ends of the leaf springs 17 and 18 are in load-bearing engagement with the rocker 20, while the outer ends rest upon the fixed spring hangers 21 and 22, which are located at opposite ends of the undercarriage. The weight load of the undercarriage thus acts through both springs, which in turn, act through the rocker to divide the load between the tandem axles. The rockers 20 at opposite sides of the undercarriage pivot independently of one another, such that the suspension system equalizes the load at opposite sides of the vehicle through independent action.

The forward axle 5 is connected to the undercarriage through a forward set of radius rods, indicated generally at 23, which are pivotally connected to the fixed spring hangers 21 while the rearward axle 6 includes a rearward set of radius rods, indicated generally at 24, which are pivotally connected to the bracket 25 of rocker 20. The radius rods are located beneath the leaf springs 17 and 18 in vertical planes generally parallel with the side plates 11—11 of the undercarriage, as shown in FIGURE 2. The radius rods permit the axles to swing in a generally vertical arc in response to spring action while maintaining the axles in proper alignment with the undercarriage, with the ends of the springs properly aligned with and in bearing engagement with their hangers and rockers. As described later in detail, the radius rods at one side of the vehicle are adjustable lengthwise, while those on the opposite side are fixed in length.

The conventional trailer is provided with a braking system, usually air-operated, each axle having a brake mechanism as generally indicated at 26 in FIGURES 2 and 4, which may comprise a brake drum carried by the wheel, with the brake shoes or other friction elements anchored to the axle. Accordingly, when the brakes are applied, brake torque is developed by the rotating wheels, which tends to rotate the axles. According to the present invention, the brake torque is absorbed by a torque arm 27 welded to each axle and rising upwardly therefrom as viewed in FIGURES 2 and 3. The upper end of each torque arm is pivotally connected to a link 28 having its opposite end pivotally connected to a bracket 29 of cross member 14 to absorb the torque when the brakes are applied. As viewed in FIGURES 2 and 4, the torque arms 27 and their links 28 preferably are located at one side in an inboard position with respect to the side plates 11 of the undercarriage. However, the arms and links may be located at any point along the axle so long as there is no interference of the arms and links with the undercarriage or trailer body during road transport.

From the foregoing, it will be observed that the axles 5 and 6 are free to move vertically relative to the undercarriage in response to spring action, while each axle is held firmly against rotation under brake torque by operation of the torque arms 27 and links 28. This arrangement provides more efficient braking action and spring action because the brake torque does not react through the springs. It will also be observed that the combination of the links and radius rods provide a parallelogram action tending to maintain the leaf springs 17 and 18 in level planes in the vertical movements of the axles. However, in order to obtain the desired equalizing action, the leaf springs must be free to rotate or twist within limits relative to the axles. In other words, if the springs were not free to turn slightly with respect to the axles, then they would not be able to pivot the rocker 20 (FIGURE 13) or at least the rocking action would be greatly restricted with a corresponding decrease in the load equalizing action. In order to provide full equalization, combined with full equalization, combined with full stabilization against brake torque, the leaf springs are carried upon spring seats, which include rubber bushings in compression about the axles, as described in detail below.

Referring to FIGURE 3, each leaf spring 17 and 18 is carried upon a split spring seat indicated generally at 30 yieldably embracing the axle through rubber bushings and clamped in place by respective U-bolts 31 at opposite sides of the spring. The upper ends of the U-bolts pass through respective spring pads 32 seated upon the top surface of the spring and clamped in place by nuts 33 threaded upon the upper ends of the U-bolts.

Referring now to FIGURES 6 and 7, each spring seat comprises an upper section or block 34 having a flat top surface 35 to receive the lower surface of the leaf spring, the seat section being bored as at 36 to receive the U-bolts 31 which pass upwardly along opposite sides of the leaf spring. The lower section or cap 37 is provided with grooves 38 (FIGURE 6) to receive the curved portion of the U-bolts, the upper and lower sections encircling the tubular axles 5 and 6, with rubber bushings 40 interposed between the spring seat sections and axle. As shown in FIGURE 7, a slight gap 41 exists in the meeting line of the two sections when they are fully clamped. As viewed in FIGURE 6, the internal bore delineated by the spring seat sections includes annular ribs 42 which confine the rubber bushings axially under compression.

In order to locate the spring seat along the axle and to prevent displacement, each axle is provided with a series of blocks or abutments 43 (FIGURE 6) which reside along opposite sides of the assembled spring seat. Although the compressed rubber bushings 40 firmly embrace the axle, they permit the spring seat to be displaced angularly about the axle so as to permit the leaf springs to tilt as the opposite ends spring react against the fixed hangers and shiftable rocker.

The rearward ends of the radius rods 23 and 24, which maintain the axles and springs in proper alignment, are pivotally connected to the spring seats of the forward and rearward axles 5 and 6. For this purpose, the upper section 34 of each spring seat is provided with a pair of spaced lugs 44 (FIGURES 7 and 8) to receive the rearward ends of the radius rods, which are pivotally connected to the lugs 44 by respective pivot bolts 45 passing through the lugs. The pivotal connections of the radius rods may include rubber bushings as described in detail later with reference to FIGURE 5. As noted earlier, one radius rod of each set (FIGURES 3 and 4) is adjustable to provide length adjustment. The adjustable radius rods each include a turnbuckle 39 which is adjusted at assembly to the required length. The radius rods are locked in adjusted position by means of locking bolts 46 (FIGURE 3). This construction is well known and therefore is not disclosed in detail.

The forward ends of the radius rods 23 are pivotally connected to the fixed spring hangers 21 and the forward ends of the radius rods 24 are pivotally connected to the rocker brackets 25, as indicated in FIGURE 3. Referring to the forward radius rod 23, it will be noted in FIGURES 8 and 10 that the lower end of the fixed spring hanger 21 is bifurcated as at 47 to receive the end of the radius rod, with a pivot bolt 48 passing through the hanger and radius rod. This pivot bolt may also include a rubber bushing arrangement as described later with reference to FIGURE 5. Above the pivot bolt 48, the hanger 21 includes a spring bearing plate 50 (FIGURE 10) having a curved contact surface which establishes a rolling contact with the end portion of the leaf spring 17.

As best shown in FIGURE 14, the forward spring hangers 21 are securely attached as by welding to the undercarriage and depend downwardly therefrom. The rearward spring hangers 22 are attached to the undercarriage in the same manner. In order to reinforce the structure, additional cross members 51—51 (FIGURE 3) extend across the undercarriage and have their opposite ends welded to the spring hangers. The rearward spring hanger 22 is similar to the forward hanger 21 except that the bifurcated lower end has been omitted since the rearward radius rod 24 is anchored to the rocker arm bracket 25.

As shown in FIGURES 5 and 11, each rocker bracket 25 comprises a mounting plate 52 secured by welding to the side plate 11 of the undercarriage at opposite sides and includes a U-shaped body section 53 joined to the mounting plate 52 by suitable ribs and flanges 54. The brackets 25 are joined to the undercarriage at points adjacent the opposite ends of the intermediate cross member 14 for rigidity. The rocker 20 is carried upon a pivot pin 55 passing through the spaced walls of the body 53.

The rocker 20 is generally U-shaped in cross section and fits within the U-shaped body 53 of the bracket, the rocker having a bushing 56 journalled on the pivot pin 55. As shown in FIGURE 11, the endwise portions of the rocker project outwardly on opposite sides of the bracket, and these portions include respective cross ribs 57—57 which provide bearing surfaces for the adjacent ends of the leaf springs 17 and 18.

As shown in FIGURE 5, the lower portion of the rocker bracket 25 below the rocker is provided with a pivot bolt 58 which passes through the end of the rearward radius rod 24. The pivot bolt is sleeved and includes a rubber bushing 60 confined within the end of the radius rod to provide a cushioning effect. The rubber bushing shown in this view is typical and may be utilized at all points of pivotal connection of the radius rods and links previously described.

From the foregoing, it will be noted that the suspension system distributes to both springs 17 and 18 the weight load of the undercarriage, such that each spring carries its proportionate share of the load. Since the rockers 20 at opposite sides of the vehicle are free to pivot individually, the systems operate independently of one another in response to the road conditions acting upon the tandem wheels at opposite sides of the vehicle. By way of example, when a leading wheel strikes a roadway obstruction, as indicated diagrammatically at 61 in FIGURE 13, that particular wheel rebounds upwardly as indicated by the arrow, while the radius rod 23 and link 28 act to permit upward motion of the axle 5. As a consequence, the leaf spring 17 is maintained generally in a level plane by operation of the rod and link, as the spring is deflected upwardly under the impact. This impact force is resisted by the fixed bracket 21 at one end of the spring and by the rocker 20 at its opposite end. By virtue of the cushioned mounting of the spring seat, the spring and its seat twist slightly with respect to the axle 5, thus imparting the rocking motion to the rocker 20, as indicated by the arrows A. The downward motion of the opposite end of the rocker is thus transmitted to the end of the tandem spring 18, which is likewise free to rock slightly by virtue of the cushioned seat. The rotary deflection of the cushioned spring seat 30 (and spring) with respect to torque arm 27, is indicated diagrammatically at B in FIGURE 13. Accordingly, one portion of the impact is absorbed by the spring 17 while another portion is absorbed by the spring 18 to improve the riding qualities of the vehicle and to absorb the road shocks which are imposed upon the wheels.

By virtue of the torque arms and links, the brake torque is completely isolated from the leaf springs, providing smooth independent spring action even when the brakes are applied under emergency conditions while travelling at high speed. Moreover, by isolating the braking forces from the springs, the tendency for the axles to skip or bounce under brake torque is eliminated, thereby bringing about a substantial reduction in the stopping distance and also decreasing tire wear due to braking forces.

Having described my invention, I claim:

1. A tandem spring suspension system for a roadway vehicle comprising, a pair of tandem axles extending transversely beneath said vehicle, road wheels journalled on said axles and including brake mechanism interconnecting the wheels and axles, tandem leaf springs mounted on said axles at opposite sides of the vehicle, said springs including spring seats, torsionally resilient means interposed between the spring seats and axles adapting the springs to rock relative to the axles about the centers of said axles within the yield limits provided by said torsionally resilient means, means on said vehicle engaging the outer ends of said tandem springs at opposite sides, respective tiltable rocker elements pivotally mounted on the vehicle at opposite sides and having outer ends in bearing engagement with the adjacent inner ends of said tandem springs, whereby the weight load of the vehicle is transmitted to said tandem leaf springs and equalized by said rocker elements, torque resisting means interconnecting the axles and vehicle adapted to lock the axles against rotation under the torque forces which are transmitted to the axles upon application of said brake mechanism, and radius means interconnecting said tandem axles and vehicle, said radius means adapting said axles to shift vertically relative to the vehicle in response to impact forces during road transport, said leaf springs adapted to rock relative to the non-rotatable axles under impact forces through operation of the said torsionally resilient means and to tilt said rocker elements, whereby an impact force imposed upon one axle and leaf spring is transmitted through the rocker element to the tandem leaf spring and equalized by said leaf springs.

2. A tandem spring suspension system for a roadway vehicle comprising, a pair of tandem axles extending transversely beneath said vehicle, road wheels journalled on said axles and including brake mechanism interconnecting the wheels and axles, respective pairs of spring seats mounted on said axles at opposite sides of the vehicle, resilient bushings interposed between the axles and spring seats adapting the spring seats to rock about the centers of the axles within the yield limits provided by said resilient bushings, tandem leaf springs mounted on said springs seats at opposite sides of said vehicle, means on said vehicle engaging the outer ends of said tandem leaf springs at opposite sides, respective tiltable rocker elements pivotally mounted on the vehicle at opposite sides and having outer ends in bearing engagement with the adjacent inner ends of said tandem springs, whereby the weight load of the vehicle is transmitted to said tandem leaf springs and equalized by said rocker elements, torque resisting means interconnecting the axles and vehicle adapted to lock the axles against rotation under torque forces which are transmitted to the axles upon application of said brake mechanism, and radius means interconnecting said tandem axles and vehicle, said radius means adapting said axles to shift vertically relative to the vehicle in response to impact forces during road transport, said leaf springs adapted to rock relative to the non-rotatable axles under impact forces through operation of the said resilient bushings and to tilt said rocker elements, whereby an impact force imposed upon one axle and leaf spring is transmitted through the rocker element to the tandem leaf spring and equalized by said leaf springs.

3. A tandem spring suspension system for a vehicle comprising, a pair of tandem axles extending transversely beneath said vehicle, road wheels journalled on said axles and including brake mechanism interconnecting the wheels with the axles, a pair of spring seats mounted on each of said axles, each of said spring seats including a torsionally resilient bushing surrounding the axle, tandem leaf springs mounted on said spring seats at opposite sides of the vehicle, said torsionally resilient bushings adapting said spring seats and leaf springs to rock about the centers of said axles within the yield limits of said bushing, respective fixed spring hangers mounted on said vehicle and engaging the outer ends of said tandem springs at opposite sides of the vehicle, a tiltable rocker pivotally mounted on the vehicle between the adjacent inner ends of said tandem springs at opposite sides, said rockers having opposite outer ends in bearing engagement with the adjacent inner ends of said tandem springs, whereby the weight load of the vehicle is transmitted to said springs and equalized by the rockers, a torque element projecting from said axles, means interconnecting the torque element and vehicle adapted to lock the axles against rotation under torque forces which are transmitted to the axles upon operation of said brake mechanism, and radius means interconnecting the axles and vehicle adapting said axles to shift vertically in response to impact forces during road transport, said spring seats adapting said springs to rock relative to said non-rotatable axles under said impact forces and to actuate said rockers, whereby an impact force imposed upon one axle is transmitted from the spring thereof through said rocker to the tandem spring and equalized between the tandem leaf springs.

4. A tandem spring suspension system for a roadway vehicle comprising, a pair of tandem axles extending transversely beneath said vehicle and spaced downwardly therefrom, road wheels journalled on said axles and including brake mechanism interconnecting the wheels with the axles, radius means connecting said axles to the vehicle adapting the axles to move in a vertical direction relative to the vehicle, torque resisting means interconnecting the axles and vehicle adapted to lock the axles against rotary brake torque forces, a pair of spring seats on each of said axles, respective yieldable bushings on said axles, said spring seats comprising half sections embracing said yieldable bushings from opposite sides, clamping means forcing said half sections into engagement with said bushings, said bushings adapting said spring seats to rock in a rotary direction relative to the axles by operation of said yieldable bushings, respective leaf springs mounted on said spring seats and disposed in tandem relationship at opposite sides of the vehicle, respective fixed hangers mounted on said vehicle and engaging the outer ends of said tandem springs at opposite sides, respective rockers pivotally mounted on the vehicle and disposed between the adjacent inner ends of said tandem springs at opposite sides, said rockers having outer ends in bearing engagement with the adjacent inner ends of said tandem springs, whereby the weight load of the vehicle is transmitted to said springs and equalized by said rockers, said yieldable spring seats adapting the springs to rock relative to said non-rotatable axles under impact forces and to tilt the rockers, whereby an impact force imposed upon one axle is transmitted by the spring thereof through said rocker element to said tandem spring and equalized by the tandem springs.

5. A tandem spring suspension system for a roadway vehicle comprising, a pair of tandem axles extending transversely beneath said vehicle, road wheels journalled on said axles and including wheel brake mechanism interconnecting the wheels with the axles, radius means connecting said axles to the vehicle adapting the axles to move in a vertical direction relative to the vehicle, torque resisting means interconnecting the axles and vehicle adapted to lock the axles against rotary brake torque forces, a pair of spring seats on each of said axles, respective yieldable bushings interposed between the spring seats and axles, said spring seats comprising upper and lower sections embracing the yieldable bushings from opposite sides, respective leaf springs mounted on the upper sections of said seats and disposed in tandem relationship at opposite sides of the vehicle, clamping bolts passing about the lower section of each spring seat and extending above said spring, said bolts forcibly clamping the sections about the yieldable bushing and securing the spring to the seat, respective hangers mounted on said vehicle and engaging the outer ends of said tandem springs at opposite sides, a rocker element pivotally mounted on the vehicle and disposed between the adjacent inner ends of said tandem springs at opposite sides, said rockers having outer ends in bearing engagement with the adjacent inner ends of said tandem springs, whereby the weight load of the vehicle is transmitted to said springs and equalized by said rockers, said spring seats adapting the springs to rock relative to said axles by operation of the yieldable bushings and to actuate the rockers under impact forces, whereby an impact force imposed upon one axle is transmitted by the spring thereof through said rocker element to said tandem spring and absorbed by the tandem springs.

6. A tandem spring suspension system for a roadway vehicle comprising, an undercarriage residing beneath the vehicle, a pair of tandem axles extending transversely across said undercarriage and spaced downwardly therefrom, road wheels journalled on said axles and including brake mechanism interconnecting the wheels with the axles, a pair of radius rods pivotally connecting said axles to the undercarriage adapting the axles to shift in a generally vertical arc relative to the undercarriage, a torque arm rigidly secured to each of said axles, respective links pivotally connecting said torque arms to the undercarriage, said torque arms and links locking said axles against rotary brake torque forces, tandem leaf springs yieldably mounted on said axles at opposite sides of the undercarriage in torsionally resilient relationship to the axles, respective hanger elements mounted on said undercarriage and engaging the outer ends of said tandem springs at opposite sides of the undercarriage, a rocker element pivotally connected to the undercarriage and disposed between the adjacent inner ends of said tandem springs at opposite sides, said rocker elements having outer ends in bearing engagement with the adjacent inner ends of said tandem springs, whereby the weight load of the undercarriage is transmitted to said springs and equalized by the rocker elements, said yieldably mounted springs adapted to rock about the centers of said non-rotatable axles under impact forces and to actuate said rocker elements, whereby an impact force imposed upon one axle is transmitted by the spring thereof through said rocker element to the tandem leaf spring and absorbed by the tandem leaf springs.

7. A tandem spring suspension system for a roadway vehicle comprising, an undercarriage residing beneath the vehicle and having a pair of side members, a pair of tandem axles extending across the undercarriage and spaced downwardly therefrom, road wheels journalled on said axles and including brake mechanism interconnecting the wheels with the axles, spring seats mounted on said axles in torsionally resilient relationship therewith, tandem leaf springs mounted on said spring seats beneath the side members of the undercarriage, respective pairs of radius rods pivotally interconnecting the axles with the undercarriage, at least one torque arm rigidly secured to each of said axles and projecting upwardly therefrom, said torque arms disposed in an inboard position relative to the side members of the undercarriage, a link pivotally interconnecting each of said torque arms with the undercarriage and locking said axles against rotary brake torque forces, respective spring hangers mounted on said undercarriage and engaging the outer ends of said tandem springs at opposite sides, respective rockers pivotally connected to the undercarriage at opposite sides and having opposite ends in bearing engagement with the inner ends of said tandem springs, whereby the weight load of the carriage is transmitted to said springs and equalized by the rockers, said torsionally resilient spring seats adapting the tandem springs to rock relative to said non-rotatable axles under impact forces and to actuate said rockers, whereby an impact force imposed upon one axle is transmitted from one tandem spring through said rocker to the second tandem spring and absorbed by the tandem springs.

References Cited in the file of this patent

UNITED STATES PATENTS

| | | |
|---|---|---|
| 1,939,155 | Wise | Dec. 12, 1933 |
| 2,577,322 | Frazier | Dec. 4, 1951 |
| 2,702,194 | Alden | Feb. 14, 1955 |
| 2,900,197 | Hutchens | Aug. 18, 1959 |

FOREIGN PATENTS

| | | |
|---|---|---|
| 541,124 | Great Britain | Nov. 13, 1941 |